May 23, 1933.  C. B. BALLARD  1,911,102
METHOD AND APPARATUS FOR CLEANING FRUIT
Filed July 7, 1928      5 Sheets-Sheet 1
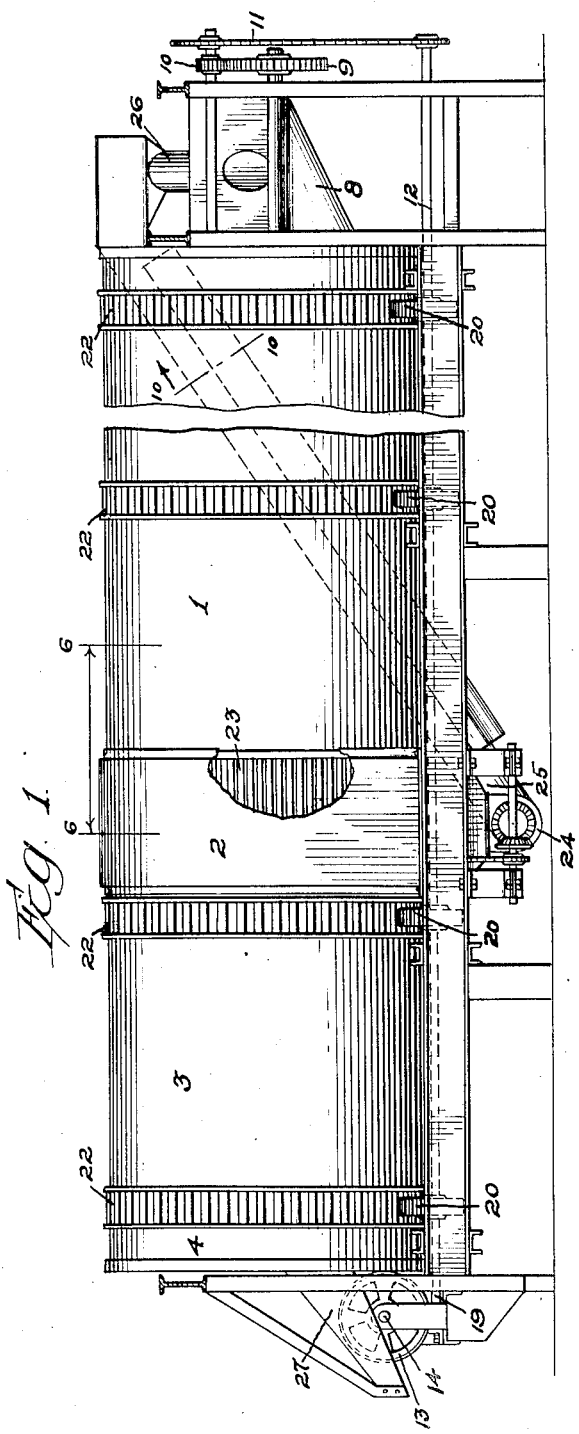
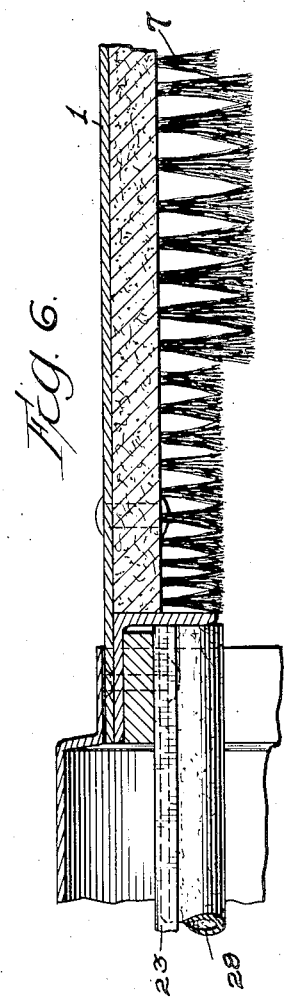
Inventor
Carol B. Ballard
Graham
Atty.

May 23, 1933. C. B. BALLARD 1,911,102
METHOD AND APPARATUS FOR CLEANING FRUIT
Filed July 7, 1928 5 Sheets-Sheet 2
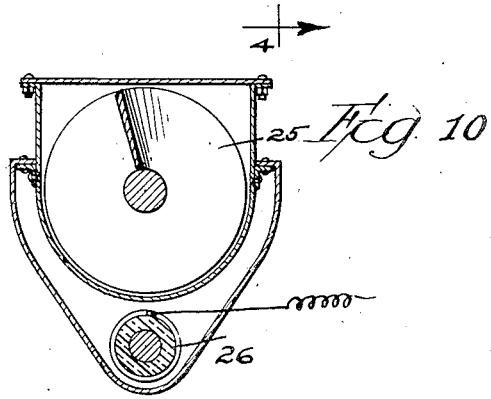

May 23, 1933.     C. B. BALLARD     1,911,102
METHOD AND APPARATUS FOR CLEANING FRUIT
Filed July 7, 1928     5 Sheets-Sheet 3

Inventor:
Carol B. Ballard

May 23, 1933.  C. B. BALLARD  1,911,102
METHOD AND APPARATUS FOR CLEANING FRUIT
Filed July 7, 1928  5 Sheets-Sheet 4
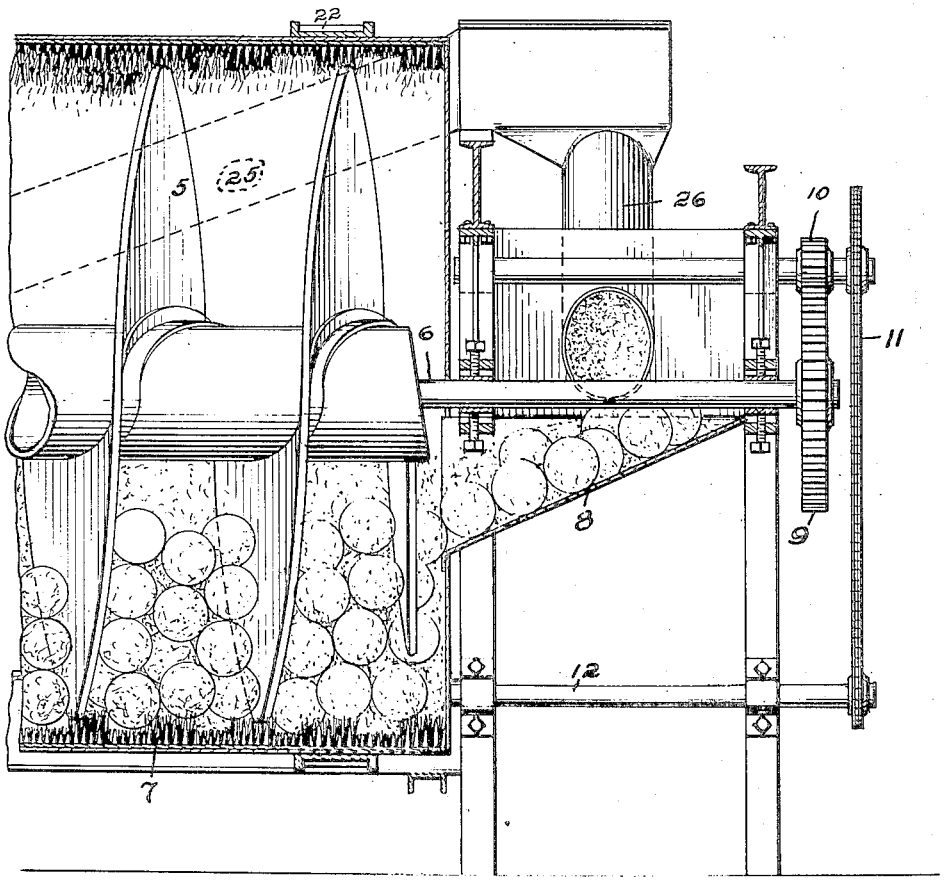
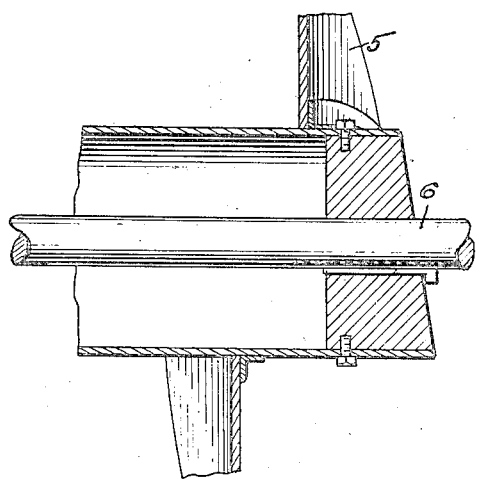
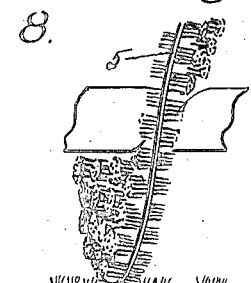

May 23, 1933.   C. B. BALLARD   1,911,102
METHOD AND APPARATUS FOR CLEANING FRUIT
Filed July 7, 1928   5 Sheets-Sheet 5

Inventor
Carol B. Ballard
Graham
Atty.

Patented May 23, 1933

1,911,102

UNITED STATES PATENT OFFICE

CAROL B. BALLARD, OF TAMPA, FLORIDA, ASSIGNOR TO SPRAGUE-SELLS CORPORATION, OF HOOPESTON, ILLINOIS

METHOD AND APPARATUS FOR CLEANING FRUIT

Application filed July 7, 1928. Serial No. 290,975.

This invention relates to a new and improved method and apparatus for cleaning and polishing the outer skin surfaces of citrus and other fruits or articles of a like nature.

Citrus fruits are gathered from the orchards in field crates or boxes for conveyance to the packing houses. Here they are dumped on roller feed belts or conveyors or other suitable apparatus which conveys and turns the individual fruits over and over, the spacing between the rollers permitting the escape and separation from the fruit of much adhering debris such as leaves, stems sand and dirt of various descriptions. This is only a preliminary cleaning operation to remove from the mass large and loose particles of undesirable material that has been gathered with the fruit or which has become attached through various means during the period of growth.

The outer surfaces of the skins of all fruits gather much fine residue during its exposure to the elements during the growing period. Rains and fogs wet the growing fruits; dust and dirt of various kinds flying through the air accumulate on the surfaces of the fruits and are more or less made quite adherent thereon through the frequent applications of moisture, and some materials adhere with so much tenacity that quite vigorous means must be employed to remove them.

My invention provides a method and apparatus for receiving the mass of fruits in a continuous stream from the preliminary roller cleaner referred to and subjecting each individual fruit to a scrubbing and cleaning operation in combination with a suitable cushioning compound interspersed in the interstices between the individual fruits. The fruits are conveyed en masse through a revolving drum lined with suitable brushes which tumbles the fruits over and over in contact with the scrubbing brushes, the compound and more or less with each other. The compound, however, keeps the fruits sufficiently separated and cushioned to prevent damage or bruising from contact with each other or any part of the apparatus. The stream of fruit is conveyed in this manner through a first cleaning portion of the apparatus and for a long enough time to thoroughly scrub and clean the surfaces of all adhering debris even down into the bottoms of the skin pores and without the least particle of injury to the outer surfaces, and without the application of moisture at any time during the scrubbing operation, in fact the action of the compound in connection with the brushing removes and absorbs any adhering moisture that might be present when the fruit is delivered to the packing house.

After the stream of fruit is passed through the scrubbing section of the apparatus it enters a section where the compound is automatically separated from the mass without stopping or interfering in the least with the continuous movement of the mass. In this section practically all of the compound is separated and passes into a special conveyor compartment where it is dehydrated and carried back to be used over and over until worn out. Passing from the compound separating compartment the stream of fruit enters a final polishing section of the apparatus which is somewhat similar to the first section where the scrubbing takes place. This polishing section, however, has no compound and the cylinder or rotating drum is lined with very soft horse hair brushes over which the stream of cleaned fruit is rolled and tumbled and receives a final high polish. From here it is accumulated in a pocketed discharge device which conveys the mass of moving fruit to a discharge spout leading to an inspection table where the fruit is examined for defects of various sorts and for grades, or it may be delivered to any other apparatus that may be found desirable in the handling of fruit in the manner described.

A very important part of my invention resides in the use of a cushioning compound and in the nature of the compound itself.

Where a mass of somewhat delicate skinned fruit like the citrus fruits, is handled continuously in a cleaning operation where the fruit must be agitated and rolled against each other and cleaning means, the compound provides the cushion necessary to protect the delicate skin surfaces against abrasion or puncture from the stiff bristles of the cleaning brushes employed. The compound should be somewhat absorptive so as to take up any moisture adhering to the fruit when it is presented to the cleaning machine; it should have a mild preservative to protect it from molds and other deleterious agencies and it should have good wearing qualities so that it does not have to be changed or replaced too frequently. The special compound I have devised for this purpose and which I use has been made the subject matter of a copending application filed by me under date of May 24, 1928, and bearing Serial No. 279861. The compound is described in detail in this application and therefore need not be specifically described in this application further than is necessary and desirable to make a complete disclosure of the invention herein.

A principal object of the invention therefor resides in providing an apparatus that will permit the moving of articles such as citrus fruit in a continuous stream in operative relation with devices that will clean all adhering debris from the surfaces thereof.

A further object of the invention resides in providing a cushioning medium to intermix with the stream of fruit which will help to effect the desired cleaning and at the same time act to protect the individual fruits from abrasion or damage during the cleaning operation.

It is also an object of the invention to provide a fruit cleaning means comprising a series of brush members arranged to contact with the passing fruits and remove the adhering undesirable matter therefrom.

It is also an object of the invention to carry on a continuous cleaning operation in combination with a cushioning compound and to automatically separate the compound from the fruit when the cleaning operation has been completed.

It is further an object of the invention to provide a fruit cleaning apparatus including as a step in the operation of subjecting a continuously moving stream of fruit to a final polishing medium to thereby give a high gloss finish to the fruit.

It is also an object of the invention to provide a continuous operation of cleaning articles such as citrus fruits in connection with a cushioning compound during the cleaning step; to remove the compound from the mass without stopping the continuous forward movement of the mass and to reuse the separated compound.

It is also an object of the invention to provide an apparatus for cleaning articles such as citrus fruits while in contact with a comminuted material to act as a cushioning medium.

It is also an object of the invention to provide an apparatus for cleaning articles such as citrus fruits while in contact with a comminuted material that has absorptive properties.

It is also an object of the invention to provide an apparatus for cleaning citrus fruits or the like while in contact with a comminuted material that includes as an ingredient a preservative medium.

It is also an object of the invention to provide a continuously operating apparatus for cleaning the outer surfaces of citrus fruits or the like including the steps of cleaning and polishing.

It is also an object of the invention to provide a fruit or like cleaning device wherein the cleaning operation is carried on while the fruit is imbedded in a comminuted material.

It is also an object of the invention to provide a fruit or like cleaning device wherein the fruit is imbedded in a comminuted material during the cleaning operation and having means for separating the fruit from the comminuted material simultaneously with the cleaning operation.

It is also an object of the invention to provide a fruit cleaning device wherein the fruit is imbedded in a comminuted material during the cleaning operation and having means for separating the comminuted material continuously and returning it to the apparatus with the incoming stream of fruit.

It is also an object of the invention to provide a fruit cleaning device wherein the fruit is imbedded in a comminuted material during the cleaning operation, separating the material from the cleaned fruit, dehydrating the material and returning it to the device.

It is also an object of the invention to provide a process for cleaning citrus fruits or the like wherein a stream of fruit is moved continuously over a predetermined path in contact with means for cleaning the skin surfaces while the stream of moving fruit is imbedded in a comminuted material.

It is also an object of the invention to provide a process for cleaning citrus fruits or the like wherein a stream of fruit is moved continuously through a rotating cleaning means wherein the cleaning is effected through the medium of brushes and a comminuted material.

It is also an object of the invention to provide a process of cleaning fruits or the like wherein a stream of continuously moving fruit or the like is brought into contact with cleaning means while imbedded in a comminuted material, then separating the comminuted material by a continuously operating means, from the cleaned fruit.

It is also an object of the invention to provide a process for cleaning citrus fruits or the like comprising the steps of moving a stream of fruit or the like through and in contact with cleaning means including a comminuted material, removing the comminuted material from the stream, dehydrating the material and returning it to the apparatus for further use.

With such objects in view as well as other advantages inherent in the invention, the novel structural peculiarities, novel organization of elements, and the separate and collective operations involved in carrying out the recited objects of my invention, I wish it understood that the several necessary elements and combinations constituting the same may be varied in their proportions, placement, general arrangement and operative relation without departing from the nature and scope of my invention. In carrying out the objects of the invention is a concrete form of machine, further objects, advantages and improvements have been evolved than have been recited, and in order to make the invention more clearly understood there are shown in the accompanying drawings means and mechanism embodying the preferred structural arrangement and the preferred disposition of the different parts and combinations wherein I have simply illustrated one way of embodying the creative part or concept of the invention. The described devices are simply embodiments of the invention which other structures might also employ and some of the parts or combinations of parts may be used without the others in different types of machines without departure from the purview of my invention and I regard myself as entitled to such variations from the shown and described devices as fall within the scope and meaning of the claims hereto appended.

In referring now to the drawings for a clearer understanding of the invention and its many advantages I wish to state that the drawings are more or less diagrammatic in character; are not necessarily drawn accurately to scale and may not represent the best engineering practices as regards construction. They are not necessarily intended to be more than illustrative.

Figure 1 represents a side elevation of an apparatus embodying my invention. The right side of the figure is the feed end of the machine. A broken away section near the center discloses the slat construction where the comminuted material is automatically separated from the mass of moving fruit without interfering with the operation of the apparatus. Underneath this section is shown the receiving means for the comminuted material and the diagonal lines represent the return conveyor for carrying the material back to the feed chute for reuse.

Figure 2 is an end elevation of the right hand end of Figure 1, clearly showing the feed chute; the comminuted material return conveyor, with a partial section broken away; the drive means and other structural parts of the apparatus.

Figure 4 is a partial sectional elevation of the feed end of the machine taken on approximately the line 4—4 of Figure 2. This view clearly shows the manner of feeding the fruit to the apparatus; the mixing of the comminuted material therewith; the cleaning brushes on the inside of the cylinder or drum; the spiral within the drum which rotates therewith and thereby carries the mass of fruit forward through the apparatus.

Figure 5:
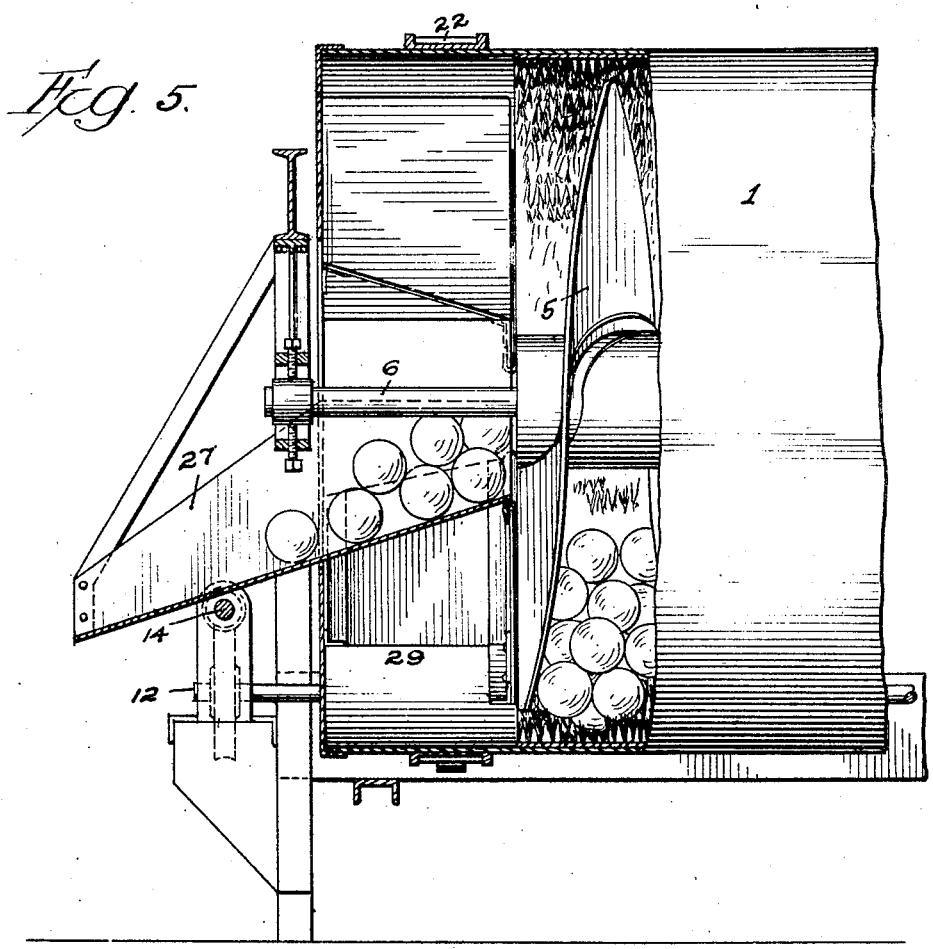

Figure 5 is a like view of the discharge end of the machine showing the mechanism for handling the fruit at this point.

Figure 6 is a partial section of the apparatus taken from approximately the space embraced by the numerals 6—6 of Figure 1 and shown in detail the brushes at the end of the cleaning section and a part of the slatted construction where the comminuted material is separated from the fruit.

Figure 7:
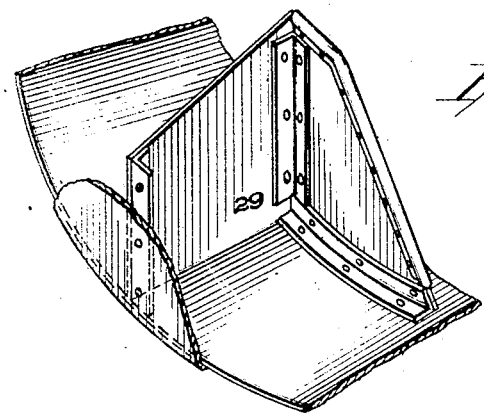

Figure 7 is a perspective of a portion of the discharge device showing one of the collecting pockets for picking up the oranges or other fruit from the advancing mass and lifting them up to the discharge outlet.

Figure 8 is a sectional detail showing the manner of mounting the long hub of the spiral on the main drive shaft. This view is a vertical section of the full line view just above in Figure 4.

Figure 9:
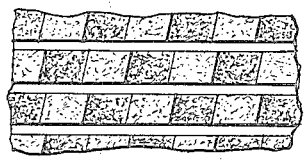

Figure 9 is a plan of a portion of the brush section looking at the bristles. The purpose of this view will be fully described in the text.

Figure 10 is a cross section of the comminuted material conveyor taken on approximately the lines 10—10 of Figure 1, and is intended to clearly show the heating coil directly under the spiral conveyor for dehydrating the material as it is being conveyed back to the feed chute for reuse.

Figure 11 is a small detail of the spiral shown in Fig. 4 but having brushes located on the sides of the spiral so that the fruits lying up along the sides of the spiral will receive a brushing and cleaning action without having to tumble around until they reach the brushes in the cylinder. This addition hastens the cleaning action and adds a polish after the fruits are cleaned.

Before proceeding with a detailed description of the method and apparatus for accomplishing the results enumerated in the foregoing I will give a brief description of the compound referred to so that a clear understanding will be had of what I mean when referring to compound.

Various comminuted materials may be used as a base for the compound, but among those that are best adapted for the purpose I have adopted cedar saw dust, that is saw dust made from cedar wood. This saw dust is taken and sifted to remove undesirable particles, after which a small portion of melted paraffin is added to a mass and thoroughly mixed therewith until it is wholly absorbed by the particles of saw dust. After this a preservative is added, many of which are suitable, but I have found that a small portion of dry benzoate of soda serves the purpose very well. This is mixed with the paraffined mass and thoroughly incorporated therewith. The resulting compound has good wearing qualities; is sufficiently absorptive to take up any ordinary moisture adhering to the fruit and the preservative element serves to prevent deterioration of the mass over quite long periods of use. The principal object of using a material of this nature is to cushion the individual fruits and hold them somewhat separated so that the agitation and tumbling during the cleaning operation will not damage the skin surfaces, and to also act with the brush elements as a cleaning medium through the abrasive action offered.

The general arrangement of a structure embodying my invention comprises an elongated cylinder mounted for rotation on a horizontal axis. This cylinder under the illustrated arrangement would include three operating stations. The first designated by the numeral 1 would be the cleaning station or section. The second designated by the numeral 2 would be the station for separating the compound from the cleaned fruit and the third station represented by the numeral 3 would be the final polishing station, and a short section 4 would be the discharge station.

Inside of the elongated cylinder is positioned a spiral member 5 extending the full length thereof and mounted for rotation on a central shaft 6, see Figs. 4, 5 and 8. The relative speeds of rotation of the cylinder and spiral may be adjusted to any desired proportion. I have found that a rotative speed of ten revolutions for the cylinder to four revolutions of the spiral gives very satisfactory results. The brushes 7 lining the entire inner surface of the section 1 of the cylinder are the primary cleaning elements. These brushes are arranged in somewhat of a checker board fashion, having alternate long and short bristles as is indicated in Figs. 4, 5, 6 and 9. This arrangement gives a better cleaning effect than if the bristles were all the same length, although bristles of the same length for all brushes will give very satisfactory results.

The main object for alternating the short and long bristle brushes is to produce a large series of bristle lined pockets into which the individual oranges will find their way during their travel through the section of the apparatus and by this means the bristles are made to cover larger areas of skin surface than they otherwise would and therefore clean more rapidly. Another reason for the alternate brushes with long and short bristles is to better enable the bristles to penetrate the cushioning compound and reach the skin surfaces of the fruits, thus the long bristles around the bristle pockets will penetrate the adjacent layer of compound very easily and therefore reach the skin surfaces more readily and since there are a very large number of such pockets a more rapid and effective cleaning is accomplished so that the cleaning section of the apparatus may be made shorter on this account.

The numeral 8 represents a feed chute for directing oranges into the feed end of the apparatus where they are picked up by the revolving spiral and slowly conveyed through the cylinder. They may be fed automatically from the preliminary roller cleaner into the feed chute 8 or placed therein by any suitable means. I have not shown any connection between these two units since this is a matter that may be easily determined by any packing house and may be arranged to suit their individual conditions.

Figure 3:
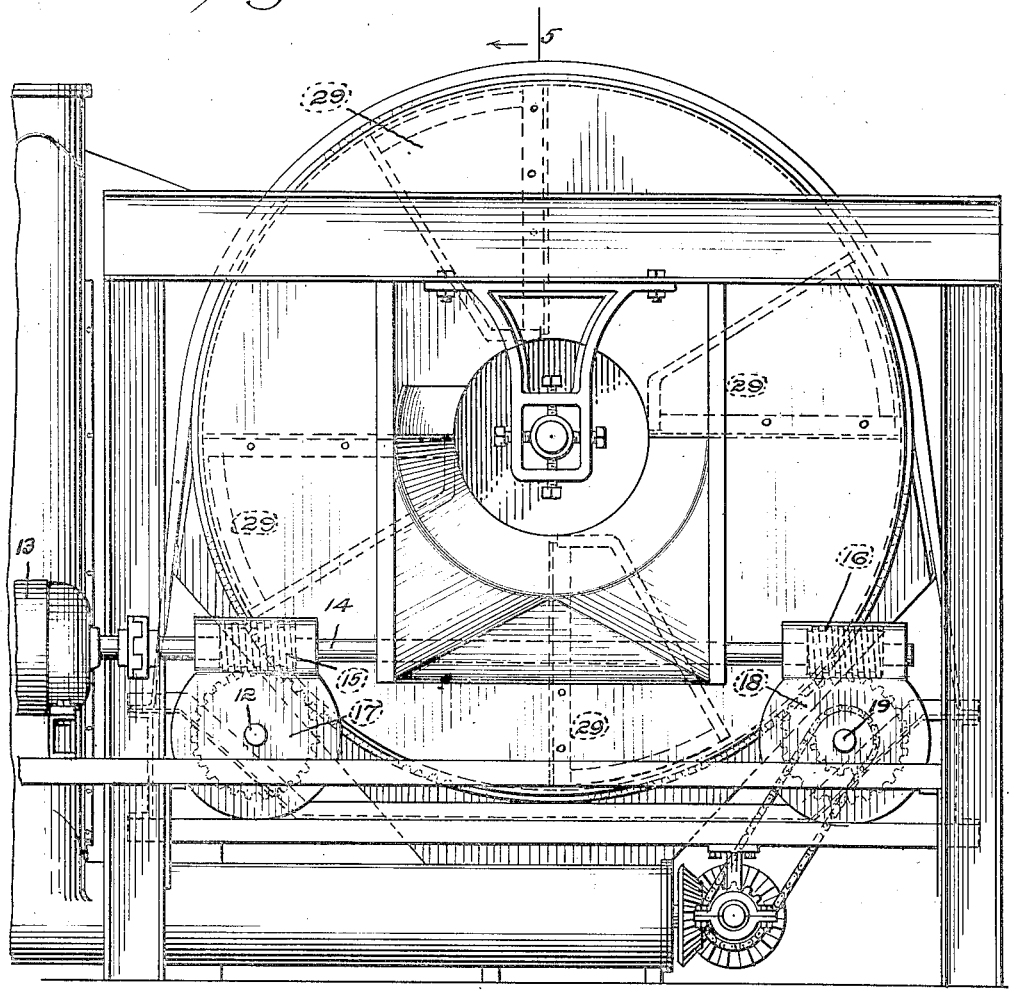
Figure 3 is an end elevation of the discharge end of the apparatus or the left hand end of Figure 1.

The spiral 5 is driven from the feed end of the machine through the medium of the gears 9 and 10 and the chain 11 leading from the drive shaft 12 extending longitudinally of the machine. The main power element comprises a motor 13 direct connected to a worm shaft 14, Fig. 3, extending across the discharge end of the machine, and carrying the worms 15 and 16, meshing with the gears 17 and 18 mounted on the shafts 12 and 19. These shafts carry turning trunnion gears 20 and 21 which in turn mesh with the large annular gears 22 mounted in spaced relation around the outer periphery of the cylinder element. The gears 20 and 21 act as drivers for the cylinder element and also as support therefor.

Section 2 of the apparatus is the station where the compound is separated from the fruit as it is moved axially through the cylinder. This section is of slatted construction as is indicated at 23 Fig. 1, the slats being spaced far enough apart to permit the compound to pass freely but not far enough to permit the fruit to pass. When the mass of fruit and compound reach this section the compound immediately works through the spaces between the slats and drops into a compartment 24 Fig. 2, where it is picked up by a screw conveyor and moved laterally to an elevating screw conveyor 25, seen best in Fig. 1 extending diagonally to the feed end of the machine. The conveyor 25 is enclosed and the housing carries a heating coil 26 Fig. 10, which is shown to be electric.

The conveyor 25 forces the compound up through the housing to a feed chute 26 where the compound is discharged into the incoming stream of fruit and is thereby again passed through the cleaning section. The compound is carried through this circuit continuously from day to day until it is worn out.

After the fruit is separated from the compound at the slatted station it passes into the section 3 where it encounters horse hair brushes of a soft texture arranged around the entire periphery of the cylinder on the inside in a like manner to the cleaning brushes of section 1. Here the fruit is rolled over these polishing brushes where it receives a very high and brilliant polish. From this section it passes to the discharge section 4 where a pocketed discharge device collects the oncoming fruit; elevates it and dumps it into a discharge chute 27 from where it passes to any other machine or operation.

In all of the handling of this class of fruit extra precaution must be taken not to bruise or break the skins. All corners and edges of the apparatus must be lined with some cushioning substance. The slatted section for example is lined with rubber hose cushioning members on the edge of each slat as is shown in Fig. 6 and indicated by the numeral 28. Sections of soft rubber hose are slit and tacked to the inner edge of each slat so that the entire area is fully cushioned.

Likewise the pocketed discharge device shown by a perspective view in Fig. 7 has the edge coming in contact with the stream of fruits covered with a soft cushion of rubber hose applied in like manner to the slatted cushions. The discharge pockets are shown by dotted lines in Fig. 3 and are designated by the numeral 29, there are four of these pockets spaced about equally as shown, the spacing permitting a batch of fruit to enter between pockets as they slowly rotate and then as a pocket moves into the mass of fruit it picks up a batch and elevates it to the point of discharge when the fruits roll out of the pocket into the discharge chute.

In the drawings I show the spiral 5 as rotating in the same direction as the cylinder 1. I wish to state, however, that I may drive the spiral against the rotation of the cylinder and find that I get increased efficiency with some fruits when operated in this manner. I therefore reserve the right to drive in either direction notwithstanding that I show only one way in the drawings. This change of direction would be accomplished by simply inserting an idler gear between the pinion 10 and the gear 9 of Fig. 2.

*Operation.*

An operative description will give details not before touched upon.

As has been stated in the preamble the oranges, limes and other citrus fruits are gathered in boxes or crates and thus delivered to the packing houses with more or less accumulated debris, some of which is removed in the roller cleaner but the more adherent dirt does not come off with this treatment. In some instances these fruits are cleaned by washing and scrubbing with suitable apparatus, but the washing of citrus fruits is rather a precarious operation and is attended with more or less dire results if not carried out under perfect conditions and the fruit finally completely and thoroughly dried before packing. Water and moisture are the breeding places for fungus and bacteria, which spreads to all fruits it comes in contact with. If the fruit is not thoroughly dry when wrapped the adherent moisture will cause what is known as blue mold or some other form of decay to set in, which will very materially affect the quality of the fruit. One spoiled fruit in a box will eventually cause the whole box to spoil. It is contended that ninety per cent of the decay in citrus fruits during transit from the packing houses to the markets is caused by moisture on the fruit as the result of using water for cleansing the fruit and then not thoroughly drying it before packing.

My improved method and apparatus described herein is primarily a dry cleaning system, no moisture of any kind is applied and any natural moisture adhering to the fruit when delivered to the machine will be completely absorbed by the compound and the fruit left dry and clean for packing.

The fruit is directed to the cleaning section of the apparatus by means of the feed chute 8 and the compound is delivered to the same feed chute with the fruit by the chute 26. Before starting operations a batch of compound is prepared as has been described and fed into the machine until a sufficient quantity has been supplied to serve its function in the cleaning operation, so that as soon as the fruit begins to flow into the cylinder the compound also begins to flow and is immediately intermingled with the fruit and is carried therewith during the entire cleaning operation. Since the drum or cylinder makes ten revolutions to four of the spiral conveyor it is seen that the fruit is rolled and tumbles around the cylinder; rubbed with the brushes lining the interior and also rubbed with the compound in which it is cushioned. The combined action of the pocketed brushes and the compound tends to remove every particle of adhering dirt or residue and the compound will remove and absorb any adherent moisture.

The checker board arrangement of the brushes with the alternating short and long bristles forming pockets thereby permits the long bristles around the edges of the pockets to easily penetrate the compound and reach down into the pores and recesses of the surfaces of the fruits and thoroughly remove the accumulations of debris.

After the cleaning operation has been completed the stream of fruit and compound reach the slatted section where the compound is automatically removed from the stream and delivered to a screw conveyor underneath the cylinder. This slatted section is covered with a suitable hood and is provided with a chute underneath which directs the compound into the screw conveyor housing. This first screw conveyor moves the compound laterally to an elevating screw conveyor which elevates the stream of compound and discharges it into the feed chute to again mix with incoming fruit. The elevating screw conveyor is completely housed and is located over a heating coil which may be of any desired construction. I have indicated an electrically heated coil as is shown in Fig. 10. This coil will keep the conveyor screw and housing sufficiently warm to thoroughly dehydrate the compound as it is being returned for reuse, so that the compound entering with the incoming fruit is warm and dry and sufficiently absorptive to take up all moisture from the fruits.

The system for handling the compound during continuous operation of the apparatus is also continuous and uninterrupted, the compound traveling throughout its enclosed circuit in unison with the moving stream of fruit being treated.

The slatted section will remove substantially all of the compound from the stream of fruit. In using the compound in the manner described more or less of its particles are reduced to dust which will adhere slightly to the individual fruits. I have previously described section 3 of the apparatus as being only a polishing section and lined completely with soft brushes. These soft polishing brushes will remove some of the adhering dust from the compound. If, however, there is more dust accumulated than it is desirable to remove with the polishing brushes the section may be divided into a dusting and polishing section. By lining the fore end of the section with what is known as tampico brushes the dust will be most effectively removed before the fruit reaches the horse hair polishing brushes which will give the fruit its final beautiful polish.

Continued use of the compound will gradually reduce it all to dust. To replenish the loss through continued use, new compound may be added from time to time, or the batch may be used as long as it will produce the desired results and then replaced with an entire new batch. If new compound is added as is necessary to keep it up to a standard it may be used without other replacement during an entire season.

The take out end of the apparatus comprises a drum section having four spaced pockets one of which is shown in Fig. 7. The end of the main cylinder forms one side of these pockets. The stream of fruit released by the spiral conveyor will roll into the space between pockets and as the pockets advance a charge of fruit will be picked up by a pocket and carried around the circle until it is elevated high enough to roll out of the pocket into the discharge chute. Fig. 5 indicates how this operation takes place. In this view I have omitted showing the fruit passing from the spiral into the space between pockets in order to make this operation clearer. The stream of fruit is shown piled up back of the spiral conveyor while as a matter of fact the stream of fruit should also fill the space in front of the spiral so as to be picked up by the advancing pocket of the discharge device.

I have mentioned several times throughout the specification that no moisture was added to the compound during the operation of the machine. This is true for many conditions of operation, but when fruits reach the machine that are quite dry on the surface it is an advantage to add a slight amount of moisture to the compound to make it adhere better to the fruit and thereby perform a better cleaning action.

What I claim as new and desire to secure by Letters Patent is:

1. An apparatus for cleaning citrus fruits and the like comprising a multi-station treating unit with a single conveyor for moving fruit continuously from station to station, means at the entrance to said treating unit to mix a comminuted material with the stream of fruit, brushing means within said unit for brushing and rubbing said fruit as it is conveyed therethrough, means forming one of said multiple stations for separating said comminuted material from said fruit and other brushing means at an advanced station for brushing said fruit after it has passed from contact with said comminuted material.

2. An apparatus for treating citrus fruit and the like comprising a rotatable elongated multi-station treating unit with a single conveyor therein for moving fruit therethrough in a continuous stream, means for supplying a comminuted material to mix with said fruit as it enters said unit to cushion and partially support said fruit while being treated, brushing means comprising comparatively stiff brushes for brushing and rubbing said fruit while mixed with said comminuted material, means forming a separate station in said unit for separating said comminuted material from said stream of fruit with other brushing means comprising comparatively soft brushes for brushing and rubbing said fruit after it has passed from contact with said comminuted material.

3. An apparatus for treating citrus fruits and the like comprising a multi-station treating unit of elongated cylindrical form, a spiral conveyor located centrally in said unit, means for rotating said unit and said spiral conveyor in the same rotative direction but at different speeds, means for delivering a comminuted material to said cylinder unit to mix with fruit flowing thereinto, brush means in the first section of said unit for preliminarily cleaning said fruit while in contact with said comminuted material, a slatted section in said unit for separating said comminuted material from said mass of fruit after the first brushing operation, a polishing and brushing section in said unit in advance of said slatted section to give said fruit a final polishing operation, with means for then discharging said treated fruit from said unit.

4. An apparatus for treating citrus fruit or the like comprising a multi-station treating unit consisting of a preliminary brushing and cleaning section, means for delivering a comminuted material to said section to intermix with said fruit and partially support the same during the cleaning operation, a peripheral slatted section for then permitting the escape of the said comminuted material whereby it is separated from said fruit, a final polishing and rubbing station for then polishing said fruit after it passes from contact with said comminuted material, with means for then discharging said treated fruit from said unit.

5. An apparatus for treating citrus fruit and the like comprising a cylindrical rotatable treating unit mounted for substantially horizontal rotations, means for rotating said cylinder, a spiral conveyor located within said cylinder, means for rotating said spiral, fruit brushing means located at either end of said cylinder, a slatted screening means located between said brushing means, means for supplying a comminuted cushioning and polishing material to one end of said cylinder treating means whereby it intermixes with the fruit therein and is then discharged from said cylinder at said slatted section, with means for accumulating said material, drying it and returning it to the entrance of said cylinder for reuse while the fruit passes over said slatted section and receives a finishing brushing and polishing operation with means for then discharging said fruit from said cylinder.

6. An apparatus for brushing and cleaning citrus or like fruits comprising a multi-station treating unit of cylindrical form and mounted for substantially horizontal rotation, means for rotating said unit, a spiral conveyor within said unit, means for rotating said conveyor, means for delivering a comminuted material to the interior of said cylindrical unit, the multi-stations of said unit comprising a plurality of brushing and polishing sections and a screening section to remove the said comminuted material before the treatment is completed, a conveyor for accumulating said comminuted material and returning it for reuse with heating means for dehydrating said material while conveying it back for reuse with cushioning means for covering the entire interior of said unit part of said cushioning means comprising brushes.

7. An apparatus for treating citrus fruit and the like comprising a treating unit having a series of treating stations, means for delivering fruit to said unit, means for delivering a comminuted material to said unit, a spiral conveyor extending through all sections in said unit, means for rotating said unit and said spiral conveyor with a differential movement for moving fruit from station to station, means comprising one of said treating stations for separating said comminuted material from said fruit leaving a station for final treatment of said fruit, means for receiving said comminuted material and returning it for reuse.

8. An apparatus for cleaning and brushing citrus fruit and the like comprising a rotatable cylinder, means for giving rotation thereto, a spiral conveyor within said cylinder to assist in moving fruit therethrough, means for rotating said spiral conveyor, means for delivering a comminuted material to said cylinder to coact with said cylinder to treat fruit therein, a screening means forming a part of said cylinder to separate said comminuted material from said fruit within the cylinder after a partial treatment, a hood overlying said screening means to confine said screened material within restricted limits, a transverse conveyor for receiving said comminuted material as it passes through said screening means and a conveyor moving at substantially right angles thereto to elevate said material for reuse.

9. An apparatus for cleaning and brushing citrus fruit and the like comprising a cylindrical treating unit, brush means arranged around the inner periphery of said cylinder, said brush means being grouped into alternate groups of long and short bristles arranged in substantially checker board fashion, each alternate group forming a pocket with upstanding bristles around the edge into which fruit will recess for more thorough cleaning, means for rotating said cylinder and means for moving fruit through said cylinder.

10. The process of cleaning and brushing citrus fruit and the like consisting of mixing fruit with a comminuted material, moving the mixed mass into contact with brushing means while agitating the same, separating the comminuted material from the fruit during the continuation of said agitation and then moving the fruit into contact with further brushing means to complete the cleaning operation.

11. The process of moving a mass of fruit through a substantially horizontal path into contact with brushing means, moving a mass of comminuted material through a circuitous path, the said paths intercepting during a portion of their travel, separating the comminuted material from the fruit at the point of separation of said paths and continuing the movement of the fruit along its path still in contact with brushing and cleaning means.

In testimony whereof I affix my signature.

CAROL B. BALLARD.